(12) United States Patent
Patel et al.

(10) Patent No.: US 10,541,433 B2
(45) Date of Patent: Jan. 21, 2020

(54) FUEL CELL-FUEL CELL HYBRID SYSTEM FOR ENERGY STORAGE

(71) Applicant: FuelCell Energy, Inc., Danbury, CT (US)

(72) Inventors: Pinakin Patel, Danbury, CT (US); Ludwig Lipp, Brookfield, CT (US); Nicholas Pasquale, Somers, NY (US)

(73) Assignee: FUELCELL ENERGY, INC., Danbury, CT (US)

( * ) Notice: Subject to any disclaimer, the term of this patent is extended or adjusted under 35 U.S.C. 154(b) by 255 days.

(21) Appl. No.: 15/449,583

(22) Filed: Mar. 3, 2017

(65) Prior Publication Data
US 2018/0254498 A1 Sep. 6, 2018

(51) Int. Cl.
*H01M 8/04089* (2016.01)
*H01M 16/00* (2006.01)
(Continued)

(52) U.S. Cl.
CPC ... *H01M 8/04097* (2013.01); *H01M 8/04201* (2013.01); *H01M 8/0656* (2013.01); *H01M 8/0681* (2013.01); *H01M 8/0687* (2013.01); *H01M 8/2495* (2013.01); *H01M 16/00* (2013.01); *H01M 16/006* (2013.01); *H02J 3/32* (2013.01); *H02J 3/387* (2013.01); *H01M 2008/1095* (2013.01); *H01M 2008/1293* (2013.01); *H01M 2250/10* (2013.01); *H01M 2250/402* (2013.01); *Y02B 90/12* (2013.01);
(Continued)

(58) Field of Classification Search
CPC ... H01M 8/2495; H01M 8/04097; H02J 3/387
See application file for complete search history.

(56) References Cited

U.S. PATENT DOCUMENTS

| 4,620,914 A | 11/1986 | Abens et al. |
| 5,198,311 A | 3/1993 | Nakazawa et al. |
(Continued)

FOREIGN PATENT DOCUMENTS

| CN | 101529632 A | 9/2009 |
| EP | 1 577 972 A1 | 9/2005 |
(Continued)

OTHER PUBLICATIONS

K. Harrison et al,; "Large Active Area Electrolyzer Stack Test Bed—Design, Data and Development", 228th Electrochemical Society Meeting, Phoenix, Arizona (Oct. 2015).
(Continued)

*Primary Examiner* — Maria Laios
(74) *Attorney, Agent, or Firm* — Foley & Lardner LLP

(57) ABSTRACT

An energy storage system for an electrical grid running on a renewable energy source includes a baseload power module, a waste converter module, and a load-following power module. The baseload power module includes a first fuel cell system configured to provide a baseload power to the electrical grid. The waste converter module is configured to extract and store hydrogen from an exhaust stream produced by the first fuel cell system. The load-following power module includes a second fuel cell system configured to receive hydrogen from the waste converter module and convert the hydrogen to electrical energy to support the electrical grid.

15 Claims, 2 Drawing Sheets

(51) Int. Cl.
*H01M 8/0656* (2016.01)
*H01M 8/04082* (2016.01)
*H02J 3/32* (2006.01)
*H01M 8/0662* (2016.01)
*H02J 3/38* (2006.01)
*H01M 8/2495* (2016.01)
*H01M 8/1018* (2016.01)
*H01M 8/124* (2016.01)

(52) U.S. Cl.
CPC .............. *Y02B 90/14* (2013.01); *Y02E 70/10* (2013.01); *Y02E 70/30* (2013.01)

(56) References Cited

U.S. PATENT DOCUMENTS

| | | |
|---|---|---|
| 5,306,577 A | 4/1994 | Sprouse |
| 5,376,470 A | 12/1994 | Sprouse |
| 5,413,878 A | 5/1995 | Williams et al. |
| 5,506,066 A | 4/1996 | Sprouse |
| 5,518,828 A | 5/1996 | Senetar |
| 5,541,014 A | 7/1996 | Micheli et al. |
| 5,658,448 A | 8/1997 | Lasich |
| 6,211,643 B1 | 4/2001 | Kagatani |
| 6,280,865 B1 | 8/2001 | Eisman et al. |
| 6,365,290 B1 | 4/2002 | Ghezel-Ayagh et al. |
| 6,475,655 B1 | 11/2002 | Nakanishi et al. |
| 6,495,025 B2 | 12/2002 | Velev |
| 6,516,905 B1 | 2/2003 | Baumert et al. |
| 6,569,298 B2 | 5/2003 | Merida-Donis |
| 8,062,799 B2 | 11/2011 | Jahnke et al. |
| 8,080,344 B2 | 12/2011 | Skok et al. |
| 8,236,458 B2 | 8/2012 | Jahnke et al. |
| 8,288,888 B2 | 10/2012 | Hinatsu et al. |
| 8,367,256 B2 | 2/2013 | Jahnke et al. |
| 9,133,553 B2 | 9/2015 | Wilson et al. |
| 9,187,833 B2 | 11/2015 | Wilson et al. |
| 9,249,518 B2 | 2/2016 | Hinatsu et al. |
| 9,303,325 B2 | 4/2016 | Hinatsu et al. |
| 9,478,819 B2 | 10/2016 | Lambrech et al. |
| 9,502,728 B1 | 11/2016 | Farooque et al. |
| 2001/0036566 A1 | 11/2001 | Dekker et al. |
| 2002/0153263 A1 | 10/2002 | Velev |
| 2003/0207161 A1 | 11/2003 | Rusta-Sallehy et al. |
| 2004/0023097 A1 | 2/2004 | Bette et al. |
| 2004/0131902 A1 | 7/2004 | Frank et al. |
| 2004/0142215 A1* | 7/2004 | Barbir ............... H01M 8/04089 429/411 |
| 2004/0205032 A1 | 10/2004 | Routtenberg et al. |
| 2004/0229092 A1 | 11/2004 | Take |
| 2005/0164069 A1 | 7/2005 | Margiott et al. |
| 2005/0227137 A1 | 10/2005 | Suga |
| 2006/0228593 A1* | 10/2006 | Grieve ............... H01M 8/04089 429/9 |
| 2008/0236647 A1 | 10/2008 | Gibson et al. |
| 2008/0248349 A1 | 10/2008 | McElroy et al. |
| 2009/0246564 A1 | 10/2009 | Mogi et al. |
| 2010/0114395 A1 | 5/2010 | Hinatsu et al. |
| 2010/0216039 A1 | 8/2010 | Jahnke et al. |
| 2012/0034538 A1 | 2/2012 | Jahnke et al. |
| 2013/0130139 A1 | 5/2013 | Kah et al. |
| 2014/0349144 A1* | 11/2014 | Kim ................... H01M 8/0668 429/9 |
| 2014/0352309 A1 | 12/2014 | Kim et al. |
| 2015/0134277 A1 | 5/2015 | Van Doorn |
| 2015/0285141 A1 | 10/2015 | Manabe et al. |
| 2016/0181647 A1 | 6/2016 | Lambrech et al. |

FOREIGN PATENT DOCUMENTS

| | | |
|---|---|---|
| EP | 1 750 321 A1 | 2/2007 |
| EP | 2 790 256 A1 | 10/2014 |
| JP | 61-085773 A | 5/1986 |
| JP | 05-129033 A | 5/1993 |
| JP | 10-199548 A | 7/1998 |
| JP | 2007-505467 A | 3/2007 |
| JP | 2007-115696 A | 5/2007 |
| JP | 2009-537954 A | 10/2009 |
| KR | 20110064723 * | 6/2011 |
| KR | 20110064723 | 6/2011 |
| KR | 20150020463 A | 2/2015 |
| WO | WO-2004/013924 A2 | 2/2004 |
| WO | WO-2012/176176 A1 | 12/2012 |
| WO | WO-2014/140962 A1 | 9/2014 |
| WO | WO-2017/184877 A1 | 10/2017 |

OTHER PUBLICATIONS

E. Price, 2nd International Workshop, Durability and Degradation Issues in PEM Electrolysis Cells and its Components, "Lifetime Prediction of PEM Water Electrolysis Stacks Coupled with RES", Freiburg, Germany (Feb. 2016).
D. Mears, M. Mann, J. Ivy, M. Rutkowski, "Overview of Central H2A Results," 2004 US Hydrogen Conference Proceedings (Apr. 26-30, 2004).
R. McConnell, "Generating Hydrogen through Water Electrolysis Using Concentrator Photovoltaics," Conference Paper NREL/CP-520-37093 (Jan. 2005).
L. Kazmerski, "PV Electrolysis," ASES Renewable Hydrogen Forum Proceedings (Oct. 1, 2003).
M. Peters, "Renewable Hydrogen Production for Use in Hydrogen Fuel Cell Vehicles," Presentation at the ACT Expo, Dallas, Texas (May 2015).
M. Peters et al, "Renewable Electrolysis Integrated System Development & Testing" (Jun. 8, 2016).
S. Licht, "Solar Water Splitting to Generate Hydrogen Fuel: Photothermal Electrochemical Analysis," J. Phys. Chem. B (Apr. 2003), 107, 4253-4260.
W. Summers, "Hydrogen Production Using Nuclear Energy," 15th Annual U.S. Hydrogen Conference Proceedings (Apr. 29, 2004).
International Search Report and Written Opinion in PCT/US2018/020577 dated Jun. 11, 2018 (15 pages).
Communication pursuant to Rule 164(1) EPC in EP 15871189 dated Jul. 6, 2018 (13 pages).
Extended European Search Report in EP 15871187.9 dated Oct. 17, 2018 (12 pages).
International Search Report and Written Opinion in PCT/US2015/066735 dated Feb. 12, 2016 (9 pages).
International Search Report and Written Opinion in PCT/US2017/028658 dated Sep. 5, 2017 (14 pages).
International Search Report and Written Opinion in PCT/US2018/021357, dated May 30, 2018 (16 pages).
Pre-Interview First Office Action dated Feb. 14, 2019 in U.S. Appl. No. 15/445,875 (3 pages).
U.S. Office Action on U.S. Appl. No. 14/578,077 dated Jul. 10, 2015 (17 pages).
U.S. Office Action on U.S. Appl. No. 14/578,077 dated Oct. 20, 2015 (18 pages).
First Office Action in CN2015800695728 dated Aug. 28, 2019, with English translation (23 pages).
International Search Report and Written Opinion in PCT/US2018/021357, dated Sep. 10, 2019 (9 pages).

* cited by examiner

FUEL CELL-FUEL CELL HYBRID SYSTEM FOR ENERGY STORAGE

BACKGROUND

The present disclosure relates to energy storage systems. In particular, the present disclosure relates to fuel cell-fuel cell hybrid systems configured to capture and store excess energy generated in renewable energy power systems.

The number of power systems relying on renewable energy sources, such as solar and/or wind sources, has increased in recent years. However, due to the intermittent nature of renewable energy sources and the variable demand of users of an electrical grid, power production does not always align with power demand. This results in undesirable supply-demand gaps within the power system. For example, when availability of the renewable energy source is low, the power system may have insufficient power supply to support the current demand on the grid. In other cases, when availability of the renewable energy source is high, power supply may exceed the current demand on the grid. This excess supply risks potential overload of the grid infrastructure, leading to grid instability, reduced reliability, and poor power quality. Power systems often curtail the use of such excess renewable energy source to avoid potential overload, resulting in underutilization of available energy.

In many cases, to address gaps where demand exceeds supply, spinning reserves, such as gas turbines, are utilized. Spinning reserves are systems that are capable of providing extra generating capacity in response to fluctuations in energy production and serve to meet an increase in energy demand when supply available from the renewable energy source is insufficient. However, to provide extra power generation within the necessary response time, spinning reserves are kept continuously running so that the reserves remain at a required operating temperature to enable quick response. This constant running reduces the overall efficiency of the power capability of the reserves. In addition, due to the need for continual operation, spinning reserves typically result in higher emissions per kWh produced when compared to conventional power plants that run on fossil fuels, effectively negating the positive environmental effects of the renewable energy system.

Other systems in addressing supply-demand gaps attempt to store excess energy captured by the renewable energy system and use the stored energy to provide extra generating capacity to the power system when needed, thereby reducing instances of curtailing of renewable energy sources. One such system is a fuel cell-based system that stores excess energy in the form of hydrogen generated by a water electrolysis process, which is then converted back to power through the use of a fuel cell during times of excess demand. However, the round-trip efficiency in storing the excess energy and converting the stored energy back to power is less than ideal with the electrolysis process operating at an efficiency of around 60% to 70%, and the fuel cell system operating at an efficiency of around 60%, resulting in a total efficiency of about 36% to 42%.

Another system for storing excess energy for later use is a battery-based system. Because batteries provide a higher overall efficiency of about 80%, battery-based systems are often utilized over fuel cell-based systems. However, the energy capacity of a battery is limited compared to hydrogen storage and, thus, battery-based systems are unable to support a grid system where demand continually exceeds supply for long periods of time. In addition, the use of batteries is less cost-effective, especially in large capacity installations where the batteries are expected to be utilized only a fraction of the time during grid operations.

As penetration of renewable energy increases, the precise and efficient management of energy produced by renewable energy power systems is becoming critical. Thus, it would be advantageous to provide an energy storage system capable of high capacity energy storage and rapid response time for flexible grid support.

SUMMARY

In certain embodiments, an energy storage system for an electrical grid running on a renewable energy source may include a baseload power module, a waste converter module, and a load-following power module. The baseload power module includes a first fuel cell system configured to provide a baseload power to the electrical grid. The waste converter module is configured to extract and store hydrogen from an exhaust stream produced by the first fuel cell system. The load-following power module includes a second fuel cell system configured to receive hydrogen from the waste converter module and convert the hydrogen to electrical energy to support the electrical grid.

In one aspect, which is combinable with the above embodiment, the first fuel cell system is a high temperature fuel cell.

In one aspect, which is combinable with the above embodiments and aspects, the second fuel cell system is a low temperature fuel cell.

In one aspect, which is combinable with the above embodiments and aspects, the waste converter module is configured to receive excess electricity from the electrical grid.

In one aspect, which is combinable with the above embodiments and aspects, the load-following power module further includes a battery.

In one aspect, which is combinable with the above embodiments and aspects, the battery is configured to receive excess electricity from at least one of the electrical grid, the baseload power module, or the load-following power module.

In one aspect, which is combinable with the above embodiments and aspects, the battery is an electric vehicle battery.

In one aspect, which is combinable with the above embodiments and aspects, the first fuel cell system is configured to receive a waste-derived fuel.

In one aspect, which is combinable with the above embodiments and aspects, the first fuel cell system is further configured to receive waste heat.

In one aspect, which is combinable with the above embodiments and aspects, the waste converter module includes a waste converter device configured to extract the hydrogen from the exhaust stream and a hydrogen storage device configured to store the extracted hydrogen from the waste converter device.

In one aspect, which is combinable with the above embodiments and aspects, the waste converter device includes an electrochemical hydrogen separator system.

In one aspect, which is combinable with the above embodiments and aspects, the waste converter device includes an electrochemical hydrogen compression system.

In one aspect, which is combinable with the above embodiments and aspects, the system further includes a water electrolyzer configured to receive excess electricity from the electrical grid. The water electrolyzer is configured to provide hydrogen to the load-following power module.

In one aspect, which is combinable with the above embodiments and aspects, the power generation of the system includes multiple baseload power sources and multiple storage sources of different chemistries and technologies to maximize redundancy and flexibility.

In one aspect, which is combinable with the above embodiments and aspects, the system offers the ability to completely decouple power, energy, and storage components in a multiple, modular fashion.

In one aspect, which is combinable with the above embodiments and aspects, the system provides for a significant increase in grid support capabilities without stranded assets to the extent that all components could typically be used daily without increased losses, unlike conventional spinning reserves.

In one aspect, which is combinable with the above embodiments and aspects, the system allows for use of on-site power generation for both exporting and storing power at the same time via fuel contained in a waste stream, unlike renewable energy sources, such as solar or wind, which have to reduce primary baseload power in order to store energy.

In one aspect, which is combinable with the above embodiments and aspects, the system further includes a control system having a controller configured to precisely manage the baseload power module, the waste converter module, and the load-following power module to support the power production capabilities of the electrical grid in accordance with demand.

In one aspect, which is combinable with the above embodiments and aspects, the control system includes unidirectional and bi-directional inverters to receive and/or provide power between the modules and/or devices of the energy storage system and between the grid and the modules and/or devices of the energy storage system.

In one aspect, which is combinable with the above embodiments and aspects, the control system is configured to sense and/or detect grid quality and adjust the absorption of excess electricity from the grid and provision of electricity to the grid in a way to provide ancillary services to the grid, thereby imparting improved power quality to the grid.

In one aspect, which is combinable with the above embodiments and aspects, the control system is configured to autonomously, or by dispatch, auctioneer the power and energy produced to maximize benefits, such as electrical efficiency, hydrogen production efficiency, available heat, short- and long-term power capacity, available energy reserves, and real and reactive power for export to the grid.

In one aspect, which is combinable with the above embodiments and aspects, the control system is configured to maximize the overall efficiency of the system at any point in time, or based on a specific time profile-driven set of characteristics.

In certain embodiments, an energy storage system may include a high-temperature fuel cell system, a waste converter module, and a low-temperature fuel cell system. The high-temperature fuel cell system is configured to receive a hydrocarbon-based fuel and output an exhaust stream containing hydrogen. The waste converter module is configured to extract and store the hydrogen contained in the exhaust stream. The low-temperature fuel cell system is configured to receive hydrogen from the waste converter module and convert the received hydrogen to electrical energy.

In one aspect, which is combinable with the above embodiments and aspects, the system further includes a battery.

In one aspect, which is combinable with the above embodiments and aspects, the electrical energy produced by the low-temperature fuel cell system is configured to supply power support to ancillary services of an electrical grid.

In one aspect, which is combinable with the above embodiments and aspects, the electrical energy produced by the baseload power module is configured to supply power support to ancillary services of an electrical grid.

In one aspect, which is combinable with the above embodiments and aspects, the excess electrical energy absorbed by the waste converter module is configured to supply power support to ancillary services of an electrical grid.

In one aspect, which is combinable with the above embodiments and aspects, the system further includes a battery configured to receive excess electricity from the electrical grid during a charge cycle and the battery is further configured to supply power support to ancillary services of an electrical grid.

In one aspect, which is combinable with the above embodiments and aspects, the system further includes a water electrolyzer configured to receive excess electricity from the electrical grid. Excess energy absorbed by the water electrolyzer is configured to supply power support to ancillary services of an electrical grid.

In one aspect, which is combinable with the above embodiments and aspects, the high-temperature fuel cell system is configured to provide a baseload power to an electrical grid and the low-temperature fuel cell system is configured to provide a load-following power to the electrical grid.

In certain embodiments, a method for supporting an electrical grid running on a renewable energy source includes providing a hydrocarbon-based fuel to a first fuel cell system, outputting an exhaust stream produced by the first fuel cell system to a waste converter device, extracting hydrogen from the exhaust stream by the waste converter device, storing the extracted hydrogen in a hydrogen storage device, and providing the stored hydrogen to a second fuel cell system to produce electrical energy for supporting the electrical grid.

In one aspect, which is combinable with the above embodiments and aspects, the first fuel cell system is a high-temperature fuel cell system and the second fuel cell system is a low-temperature fuel cell system.

In one aspect, which is combinable with the above embodiments and aspects, the method further includes supplying excess energy produced by the electrical grid to the waste converter device.

DETAILED DESCRIPTION

The present disclosure provides for an energy storage system that may be charged during periods in which power production exceeds power demand and discharged to support an electrical grid system during periods in which power production is lower than power demand. The energy storage system utilizes a fuel cell-fuel cell hybrid system having a modular design that allows for flexible storage capacity and rapid response time for distributed energy reserve. In addition to providing grid support, the system is capable of supporting ancillary services (e.g., frequency regulation, reactive power support, capacity support, demand response) to electric power utilities to increase grid power quality and overall production capabilities. For example, the modular design of the energy storage system allows for the supply of three power generation types, baseload power generation (slow-response type), load-following power generation from hydrogen storage (medium-response type), and load-following power generation from a battery (fast-response type). Each of these types addresses different power quality advantages and together allow for an advantageous mix of dynamic reserves. This provides a system that is capable of providing power generation to meet required frequency response, including an inertial response (e.g., up to a few seconds), a primary or governor response (e.g., one second to about ten seconds), and a secondary response (e.g., about tens of seconds to about tens of minutes), due to the extra capacity made available by the system when needed. In certain embodiments, the system includes power generation capabilities from multiple baseload sources and multiple storage sources of different chemistries and technologies to maximize redundancy and flexibility. In addition, the modular design of the system allows the system the ability to decouple power, energy, and storage components. Thus, embodiments of the energy storage system provides a significant increase in grid support capabilities without stranded assets to the extent that all equipment assets of the system can typically be used daily without increased losses, unlike conventional spinning reserves. Embodiments of the energy storage system also allows use of on-site power generation for both exporting and storing power at the same time via fuel from a waste stream, unlike renewable energy sources, such as solar or wind sources, which have to reduce primary baseload power in order to store energy.

Figure 1:
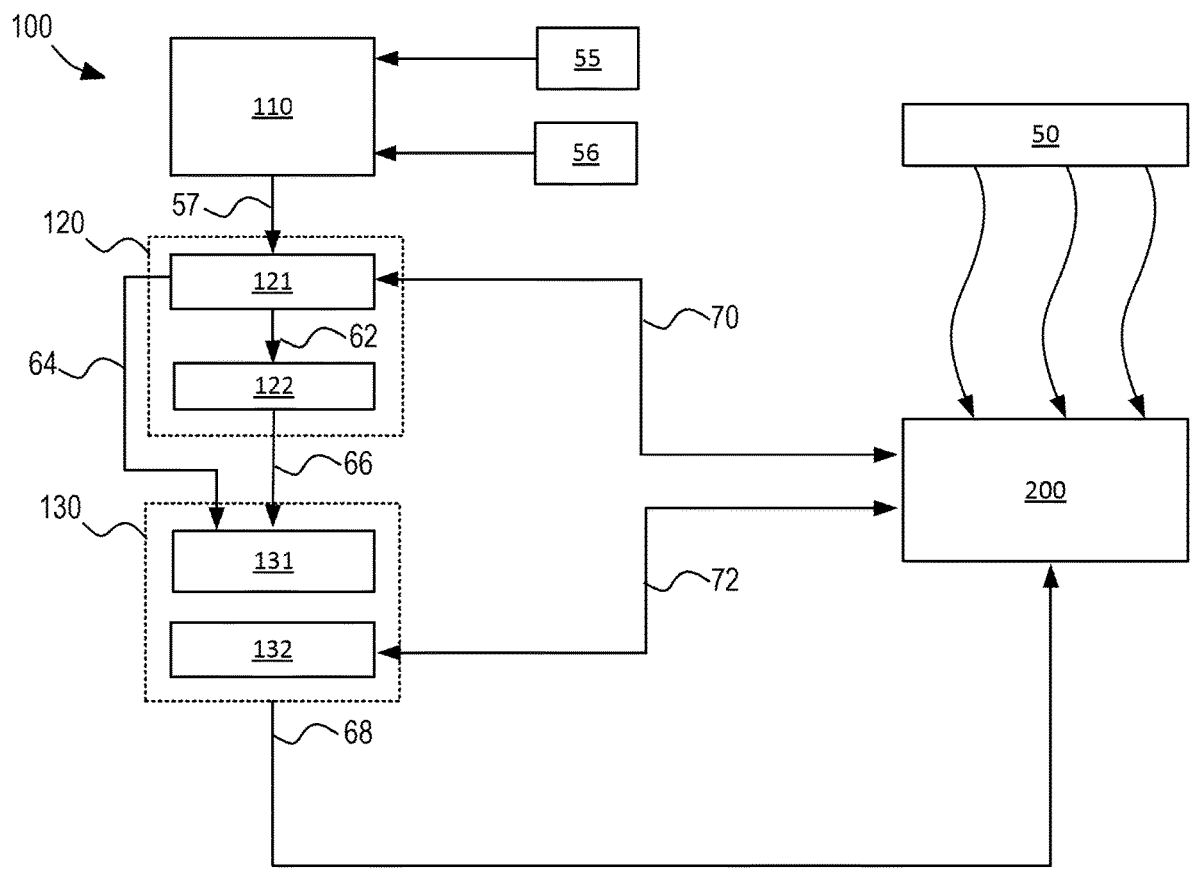
FIG. 1 is a schematic diagram of an energy storage system according to an embodiment of the present invention.

FIG. 1 schematically shows an energy storage system 100 according to an embodiment of the present invention. The energy storage system 100 is operably connected to an electrical grid 200 that receives an intermittent renewable energy source 50 in the form of, for example, wind and/or solar energy, which is then converted into electricity. Depending on current demand and supply available to the grid 200, the electrical grid 200 is configured to supply electricity to users of the grid or to the energy storage system 100.

As shown in FIG. 1, the energy storage system 100 includes a baseload power module 110, a waste converter module 120, and a load-following power module 130. As described in more detail below, each of these modules is operably connected to a controller 500 (shown in FIG. 2), which precisely manages the modules 110, 120, 130 to support the power production capabilities of the electrical grid 200 in accordance with demand.

The baseload power module 110 is configured to provide continual baseload power support to the electrical grid 200 and to continuously co-produce hydrogen for energy storage in the system 100. The baseload power module 110 comprises a first fuel cell system in the form of one or more high-temperature fuel cells, such as molten carbonate fuel cells and/or solid oxide fuel cells. As shown in FIG. 1, the first fuel cell system is configured to receive a hydrocarbon-based fuel 55 and convert the fuel 55 into electrical energy by means of chemical reactions for baseload power support for the electrical grid 200. In the embodiment shown in FIG. 1, the hydrocarbon-based fuel 55 is a waste-derived fuel, such as waste-based biogas, to provide a renewable energy baseload power system. However, the hydrocarbon-based fuel 55 is not limited to such a fuel type and may be other forms of hydrocarbon-based fuels, such as natural gas.

In some embodiments, as shown in FIG. 1, waste heat 56 may be inputted into the first fuel cell system to further enhance the efficiency of the baseload power module 110 in processing the hydrocarbon-based fuel 55. For example, in certain embodiments, by providing waste heat 56 to the first fuel cell system, the overall efficiency of the baseload power module 110 may be increased to about 85% to about 90%. The waste heat 56 may be in the form of waste heat produced by any appropriate source such as, for example, steam outputted by the waste converter module 120 (described in more detail below), exhaust heat produced by other high-temperature fuel cells utilized in the power system, heat produced from conventional heat treating processes, heat produced by solar thermal plants, low-pressure steam, and/or other industrial and refinery waste heat sources.

Through the conversion of the hydrocarbon-based fuel 55 by the first fuel cell system, the baseload power module 110 outputs an exhaust stream 57, which contains a dilute amount of hydrogen, as a byproduct. The exhaust stream 57 is then inputted to the waste converter module 120 for hydrogen purification and storage. As shown in FIG. 1, the waste converter module 120 includes a waste converter device 121 and a hydrogen storage device 122.

The waste converter device 121 is configured to extract the dilute hydrogen contained within the exhaust stream 57 of the first fuel cell system. As shown in FIG. 1, excess electricity 70 produced by the electrical grid 200 (i.e., when supply produced by the electrical grid 200 exceeds demand) is supplied to the waste converter device 121 to drive the extraction process. In certain embodiments, the waste converter device 121 is an electrochemical hydrogen separator (EHS) system, which is configured to electrochemically separate the hydrogen from the exhaust stream 57. By utilizing an EHS system, compression of the exhaust stream 57 is not needed to extract the purified hydrogen, thus increasing the reliability and efficiency of the extraction process and allowing the hydrogen to be stored at relatively low pressure. In other embodiments, however, the waste converter device 121 is an electrochemical hydrogen compression (EHC) system, which is configured to electrochemically compress the hydrogen from the exhaust stream 57. By compressing the hydrogen, storage density of the hydrogen may be increased, which increases available space for storage in cases where storage availability is limited and/or greater storage capacity is desired. In other embodiments, the waste converter device 121 includes both an EHS system and an EHC system. In yet other embodiments, the waste converter device 121 comprises the EHS system and the EHC system, which are combined into a single device that is capable of both purifying and compressing the hydrogen. In some embodiments, the waste converter device 121 comprises the EHS system, and an EHC system is provided separately as a hydrogen compressor device. In this case, the EHC system may be configured to receive the hydrogen stream produced by the EHS system and, after compressing the hydrogen stream, may provide the compressed hydrogen stream to the hydrogen storage device 122. In certain embodiments, the EHS system and the EHC system are configured to operate in a manner as disclosed in U.S. Pat. No. 4,620,914, the disclosure of which is incorporated herein by reference. However, the waste converter device 121 is not limited to EHS and/or EHC systems and, instead, may include other types of hydrogen separation systems, such as pressure swing adsorption (PSA) systems. In some embodiments, one or more water electrolyzers may be added to the waste converter module 120. The water electrolyzers may also operate on excess power generation from the electrical grid 200 to provide an additional hydrogen stream in order to supplement the hydrogen obtained from the exhaust 57 of the first fuel cell system.

As shown in FIG. 1, depending on the demand on the electrical grid 200, the waste converter device 121 is configured to supply the purified hydrogen to the hydrogen storage device 122 as a first hydrogen stream 62 (e.g., in cases when grid support is not needed) or supply the purified hydrogen directly to the load-following power module 130, described in more detail below, as a second hydrogen stream 64 (e.g., in cases when grid support is needed).

The hydrogen storage device 122, which may be in the form of a storage tank or bladder, is configured to receive the first hydrogen stream 62 for long-term energy storage. The hydrogen stored by the hydrogen storage device 122 may then be transported from the energy storage system 100 for other energy uses to produce additional revenue streams and/or, as shown in FIG. 1, may be provided to the load-following power module 130 as a third hydrogen stream 66 when grid support is needed.

When demand conditions would benefit from additional power generation, the load-following power module 130 is configured to receive purified hydrogen from the waste converter 121 and/or the hydrogen storage device 122. The load-following power module 130 includes a second fuel cell system 131 that receives the purified hydrogen as an input fuel to be converted into electrical energy. This electrical energy may then be used to provide load-following power to the electrical grid 200 when additional power generation would be beneficial. In the embodiment shown in FIG. 1, the second fuel cell system 131 is a low-temperature fuel cell system, which includes one or more low-temperature fuel cells or fuel cell stacks, such as proton exchange membrane (PEM) fuel cells, phosphoric acid fuel cells, high-temperature PEM fuel cells, and/or solid acid fuel cells. Compared to a high-temperature fuel cell system, the low-temperature fuel cell system provides a faster response time for grid support and increased efficiency for the load-following power module 130 due to the lack of heat necessary to drive the electrochemical reactions.

While the response rate of the second fuel cell system 131 is typically on the order of seconds (e.g., several seconds to tens of seconds) when power production is needed by the electrical grid 200, a faster response rate may be necessary in some cases. Thus, in some embodiments, the load-following power module 130 may further include a battery 132 (shown in FIG. 1), which is configured to receive excess electricity 72 to provide additional energy storage to the energy storage system 100. In certain embodiments, to reduce the overall cost of the system, the battery 132 is an electric vehicle battery that no longer meets a minimum energy density specification for transportation use, but has sufficient energy density for stationary use. By providing a battery 132 to the load-following power module 130, a faster response rate (e.g., less than 30 milliseconds) may be achieved for both charging (i.e., storing excess energy in the energy storage system 100) and discharging (i.e., providing stored energy to the electrical grid 200). At the same time, the hydrogen storage device 122 and the second fuel cell system 131 compensate for the limited capacity of the battery 132 by providing a long-term energy storage capacity for the energy storage system 100.

As described above, the load-following power module 130 provides grid support to the electrical grid 200 by outputting additional electrical power 68, either from the second fuel cell system 131 and/or the battery 132, when demand conditions would benefit from the additional power. As shown in FIG. 1, the electrical power 68 may be directly provided to the electrical grid 200 to support peak power generation. However, in other embodiments, the electrical power 68 produced by the load-following power module 130, the baseload power module 110, and/or the battery 132 may be used to provide ancillary services to the electrical grid 200. The absorption of excess electricity from the grid 200 by the waste converter module 120, the battery 132 (during its charge cycle), and/or the water electrolyzer (if present) can also provide ancillary services to the electrical grid 200. For example, the continual power produced by the first fuel cell system of the baseload power module 110 may support operations of non-spinning reserves or may generate power for use in capacity markets. In addition, the power produced by the second fuel cell system 131 of the load-following power module 130 may be used to support flexible capacity markets, flexible ramping capacity, and frequency regulation due to its relatively rapid response rate and extended storage capacity. Similarly, the battery 132 of the load-following power module 130 may also be configured to provide power support for flexible ramping capacity and frequency regulation due to its rapid response rate for energy production. By supporting various ancillary services of the grid 200, the energy storage system 100 may further increase grid stability, power quality, and energy efficiency of the overall utility system, providing additional benefits to the utility system. For example, power quality improvements allow for extended reactive power support used for power factor correction and voltage regulation. In addition, the system 100 allows for the ability to provide several levels of dynamic response for long-term and short-term frequency regulation and dynamic network support as required more extensively in certain regions, such as Europe.

Figure 2:
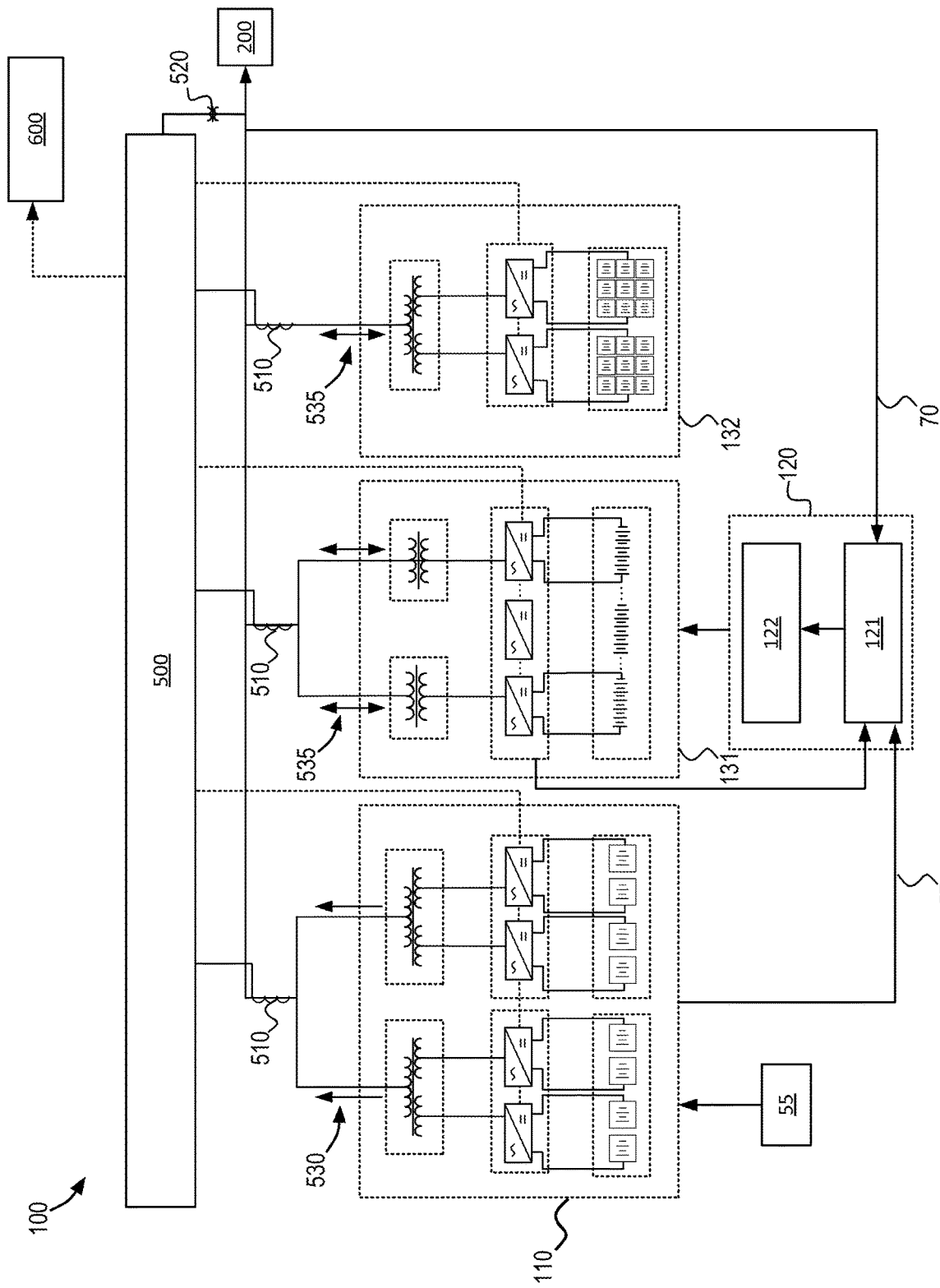
FIG. 2 is a schematic diagram of a control system for the energy storage system of FIG. 1.

As described above, each of the modules 110, 120, 130 are operably connected to a controller 500, which is configured to precisely manage the power input and power output of the energy storage system 100 according to the needs of the electrical grid 200. As shown in FIG. 2, the controller 500 communicates with a central utility communications system 600 associated with the electrical grid 200 to continuously receive information regarding the current power supply and power demand operating on the electrical grid 200. In addition, the controller 500 is configured to continuously receive information regarding the energy generation capabilities and energy storage capabilities of the modules 110, 120, 130, including current measurements 510 and voltage measurements 520, to manage the power supplied to the electrical grid 200 and excess electricity supplied to the waste converter module 121 and battery 132 (if present). To precisely store energy and deliver the stored energy from the energy storage system 100, the controller 500 is also operably connected to the baseload power module 110 through unidirectional inverters 530 and to the second fuel cell system 131 and the battery 132 (if present) through bidirectional inverters 535. The bidirectional inverter 535 may comprise one or more rectifiers (e.g., to provide power to the waste converter device 121 and/or compression system, if present, and/or the battery 132, if present) and one or more inverters to transform power received from the second fuel cell system 131 and/or the battery 132 (if present).

The controller 500 may be configured to autonomously, or by dispatch through an operator or the central utility communications system 600, auctioneer the power and energy produced by the baseload power module 110 to supply the waste storage module 120 and the load-following power module 130, as well as the battery 132 (if present), to maximize and/or balance multiple benefits, including, but not limited to, electrical efficiency, hydrogen production efficiency, available heat, short- and long-term power capacity, available energy reserves, and real and reactive power for export to the grid 200. The controller 500 may be further configured to sense or detect the grid quality and adjust the absorption of excess electricity from the grid 200 and/or provision of electricity to the grid 200 in such a way as to provide ancillary services to the grid, thereby imparting improved power quality to the grid 200. The controller 500 may also be configured to autonomously adapt to changing conditions of temperature, voltage, storage levels in the hydrogen storage device 122, storage levels in the battery 132 (if present), in order to maximize the overall efficiency of the system 100 at any point in time or to maximize overall efficiency based on a specific profile of hourly, daily, weekly, or seasonally-driven characteristics, such as adjusting hydrogen production and/or battery charge rates to most efficiently meet the necessary energy profile during daily swings, for example.

Embodiments of the energy storage system 100 described herein provide an energy storage system 100 having a flexible, long-term capacity for energy storage with a rapid response rate that can support a renewable energy power system and ancillary services in a precise and efficient manner. In particular, with its flexible, modular nature, embodiments of the system 100 are capable of providing a flexible power output in the range of about 0 to, for example, about 10 MW and a total energy storage capacity of, for example, about 25 MWh. However, given the modular nature of the system 100, the components of the system 100 may be made bigger or smaller to meet specific site and/or customer needs. For example, the ratio of the maximum power output of the energy storage system 100 (MW) to the energy storage capacity (MWh) may be varied by changing the size of the fuel cells, battery, hydrogen storage capacity, and the like. In addition, due to its hydrogen storage, the system 100 may be brought online to generate power even without an input of power from the electrical grid 200 (i.e., black start capability). Moreover, the electricity needed to drive the waste converter 131 is significantly lower compared to a conventional water electrolyzer system, allowing for an energy storage system 100 that can achieve a round-trip efficiency of greater than 80% while also providing for an extended capacity range for energy storage compared to conventional battery-based systems. And, by utilizing waste heat 56 in the baseload power module 110, hydrogen co-production may be made more efficient, leading to overall system efficiencies of about 85% to about 90%.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An energy storage system for an electrical grid running on a renewable energy source comprising:
   a baseload power module having a first fuel cell system configured to provide a baseload power to the electrical grid;
   a waste converter module configured to extract and store hydrogen from an exhaust stream produced by the first fuel cell system, the waste converter module including a waste converter device comprising at least one of an electrochemical hydrogen separator system or an electrochemical hydrogen compression system; and
   a load-following power module having a second fuel cell system configured to receive hydrogen from the waste converter module and convert the hydrogen to electrical energy to support the electrical grid;
   wherein the waste converter module is configured to receive excess electricity from the electrical grid; and
   wherein the first fuel cell system is configured to receive a waste-derived fuel.

2. The system of claim 1, wherein the first fuel cell system is a high temperature fuel cell.

3. The system of claim 1, wherein the second fuel cell system is a low temperature fuel cell.

4. The system of claim 1, wherein the load-following power module further includes a battery.

5. The system of claim 4, wherein the battery is configured to receive excess electricity from at least one of the electrical grid, the baseload power module, or the load-following power module.

6. The system of claim 5, wherein the battery is an electric vehicle battery.

7. The system of claim 1, wherein the first fuel cell system is further configured to receive waste heat.

8. The system of claim 1, wherein:
the waste converter device is configured to extract the hydrogen from the exhaust stream; and
the waste converter module further comprises a hydrogen storage device configured to store the extracted hydrogen from the waste converter device.

9. The system of claim 1, wherein the waste converter device includes the electrochemical hydrogen separator system and the electrochemical hydrogen compression system.

10. The system of claim 1, further comprising a water electrolyzer configured to receive excess electricity from the electrical grid, wherein the water electrolyzer is configured to provide hydrogen to the load-following power module.

11. An energy storage system comprising:
a high-temperature fuel cell system configured to receive a hydrocarbon-based fuel and output an exhaust stream containing hydrogen;
a waste converter module configured to extract and store the hydrogen contained in the exhaust stream, the waste converter module including a waste converter device comprising at least one of an electrochemical hydrogen separator system or an electrochemical hydrogen compression system; and
a low-temperature fuel cell system configured to receive hydrogen from the waste converter module and convert the received hydrogen to electrical energy;
wherein the electrical energy produced by the low-temperature fuel cell system is configured to supply power support to ancillary services of an electrical grid.

12. The system of claim 11, further comprising a battery.

13. The system of claim 11, wherein the high-temperature fuel cell system is configured to provide a baseload power to an electrical grid and the low-temperature fuel cell system is configured to provide a load-following power to the electrical grid.

14. A method for supporting an electrical grid running on a renewable energy source comprising:
providing a hydrocarbon-based fuel to a first fuel cell system;
outputting an exhaust stream produced by the first fuel cell system to a waste converter device;
electrochemically separating or compressing hydrogen from the exhaust stream by the waste converter device;
storing the extracted hydrogen in a hydrogen storage device;
providing the stored hydrogen to a second fuel cell system to produce electrical energy for supporting the electrical grid; and
supplying excess energy produced by the electrical grid running on the renewable energy source to the waste converter device.

15. The method of claim 14, wherein the first fuel cell system is a high-temperature fuel cell system and the second fuel cell system is a low-temperature fuel cell system.

* * * * *